United States Patent
Lehto et al.

(10) Patent No.: US 9,238,273 B2
(45) Date of Patent: Jan. 19, 2016

(54) MILLING TOOL

(75) Inventors: Ralf Lehto, Gävle (SE); Lennart Wihlborg, Ockelbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 573 days.

(21) Appl. No.: 13/434,182

(22) Filed: Mar. 29, 2012

(65) Prior Publication Data
US 2012/0275876 A1 Nov. 1, 2012

(30) Foreign Application Priority Data

Apr. 29, 2011 (SE) ...................................... 1150378

(51) Int. Cl.
| | |
|---|---|
| B23C 5/28 | (2006.01) |
| B23B 51/06 | (2006.01) |
| B23C 5/26 | (2006.01) |
| B23Q 11/10 | (2006.01) |

(52) U.S. Cl.
CPC ... B23C 5/26 (2013.01); B23C 5/28 (2013.01); B23B 2240/24 (2013.01); B23C 2240/245 (2013.01); B23Q 11/1023 (2013.01); Y10T 408/44 (2015.01); Y10T 408/45 (2015.01); Y10T 409/303976 (2015.01); Y10T 409/304032 (2015.01); Y10T 409/304088 (2015.01)

(58) Field of Classification Search
CPC B23Q 11/1023; B23B 2240/24; B23B 51/06; B23C 5/28
USPC ................................ 408/56–58; 409/135, 136
See application file for complete search history.

(56) References Cited

U.S. PATENT DOCUMENTS

| | | | | |
|---|---|---|---|---|
| 559,012 | A | * | 4/1896 | Warren .......................... 403/257 |
| 1,337,313 | A | * | 4/1920 | Groene .......................... 409/234 |
| 1,400,021 | A | * | 12/1921 | Brubaker ........................ 408/57 |
| 2,807,443 | A | * | 9/1957 | Wyman .......................... 175/404 |
| 5,667,428 | A | * | 9/1997 | Lunn ................................ 451/70 |
| 5,993,297 | A | * | 11/1999 | Hyatt et al. ...................... 451/53 |
| 6,450,738 | B1 | | 9/2002 | Ripley |
| 2002/0009339 | A1 | | 1/2002 | Arvidsson |
| 2002/0106251 | A1 | * | 8/2002 | Ripley ............................. 407/35 |
| 2004/0022594 | A1 | * | 2/2004 | Hecht ............................. 408/231 |
| 2007/0127992 | A1 | * | 6/2007 | Spichtinger et al. ............ 407/39 |
| 2007/0231097 | A1 | * | 10/2007 | Ballas et al. ................... 409/136 |
| 2009/0123244 | A1 | * | 5/2009 | Buettiker et al. .............. 408/233 |

(Continued)

FOREIGN PATENT DOCUMENTS

| | | | | | |
|---|---|---|---|---|---|
| DE | | 4416380 | A1 * | 11/1995 | ................ B23C 5/28 |
| DE | 102006028373 | A1 * | 12/2007 | ................ B23C 5/28 |

(Continued)

OTHER PUBLICATIONS

European Search Report for Application No. 12162321.9 dated Jul. 20, 2012.

Primary Examiner — Sunil K Singh
Assistant Examiner — Ryan Rufo
(74) Attorney, Agent, or Firm — Morgan, Lewis & Bockius LLP (57) ABSTRACT

A milling tool is disclosed having a front head and a rear holder, which are detachably connected by means of a male/female coupling as well as a screw and a washer. Via a main duct, cooling liquid is fed to a chamber, from which it is fed out via branch ducts to individual milling inserts. The front chamber is closed by means of a cover that is held applied against a ring surface surrounding the chamber. The cover is tightenable by means of a threaded joint that is operative independently of a threaded joint between the screw and a front section of the main duct.

19 Claims, 6 Drawing Sheets

(56) References Cited

U.S. PATENT DOCUMENTS

| | | | |
|---|---|---|---|
| 2009/0226268 A1 | 9/2009 | Pilkington | |
| 2011/0250827 A1* | 10/2011 | Smith et al. | 451/449 |
| 2012/0230781 A1* | 9/2012 | Hoffer et al. | 407/11 |
| 2013/0071196 A1* | 3/2013 | Oettle | 408/56 |

FOREIGN PATENT DOCUMENTS

| | | | | | |
|---|---|---|---|---|---|
| JP | 06-190681 A | * | 7/1994 | | B23C 5/28 |
| JP | 09-109141 A | * | 4/1997 | | B23B 41/00 |
| JP | 2000-094211 A | * | 4/2000 | | B23C 5/28 |
| JP | 2004-237401 A | * | 8/2004 | | B23C 5/28 |
| JP | 2004-276136 A | * | 10/2004 | | B23C 5/28 |
| JP | 2006-218549 A | * | 8/2006 | | B23C 5/28 |
| SE | 517817 | | 7/2002 | | |
| WO | WO 9206817 A1 | * | 4/1992 | | B23Q 10/11 |
| WO | 2007/085281 | | 8/2007 | | |
| WO | WO 2010/128930 A1 | * | 11/2010 | | B23C 5/28 |

\* cited by examiner

MILLING TOOL

RELATED APPLICATION DATA

This application is based on and claims priority under 37 U.S.C. §119 to Swedish Application No. 1150378-6, filed Apr. 29, 2011, the entire contents of which are incorporated herein by reference.

FIELD OF THE DISCLOSURE

The present disclosure relates to a milling tool of the type that comprises a front head and a rear holder, which are detachably connected by means of a male/female coupling that includes a male member included in a front part of the holder, and a seat that mouths in a rear end of the head and, via a shoulder, transforms into a wider chamber mouthing in the front end of the head adjacent to a ring surface, a washer being pressed against the shoulder by means of a threaded joint comprising, on one hand, a male thread on a screw provided with a head, and on the other hand a female thread included in a through bore that runs through the holder and serves as a main duct for the conveyance of a fluid to said chamber, from which branch ducts extend toward individual milling inserts and chip spaces in the periphery of the head in order to individually feed the fluid to the same, and the chamber being sealed by means of a cover, which is held applied against the ring surface.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Tools of the above-related kind are used to mill, by cutting or chip removing machining, workpieces of metal, such as steel, aluminium, cast iron, etc. They may also be used for the milling of composite materials.

In some applications, it is necessary to supply a flushing fluid to the individual chip channels in which the milling inserts are mounted, foremost in order to, as fast as possible, carry away the chips that are removed from the workpiece, but often also to cool the milling inserts and the surroundings thereof. When a chip-evacuating effect as well as a cooling effect is desired, some form of liquid is usually used, e.g., water or oil emulsions. If the fluid only should have a chip-removing effect, the same advantageously may be gaseous, preferably in the form of air. For this purpose, the present milling tools are constructed with an internal, suitably centrally situated, bore that forms a main duct through which the fluid can, from a storage container in or adjacent to the driving machine, be fed up to the head, where it, in one way or the other, is distributed outward to the peripherally situated milling inserts. In respect of the supply of fluid to the milling inserts, the present tools may be divided into two main categories, a first one of which makes use of a chamber that is formed in the front part of the head and to which the fluid is fed via the main duct in order to then be distributed outward individually to the milling inserts via individual, internal branch ducts, most often in the form of drilled holes or bores. The second category of tools makes use of a nozzle that is arranged in the front part of the head and, via a plurality of small nozzle holes, distributes the fluid outward to the milling inserts in an indifferent, shower-like flow. A disadvantage of the latter type of tools is that the initially pressurized fluid quickly loses its pressure as soon as the same has been flushed out through the nozzle, and then has a comparatively long distance to travel before it reaches up to the chip channel. Therefore, the rinsing of the milling inserts and the chip channels becomes fairly mediocre.

By U.S. Pat. No. 6,450,738 and WO 2007/085281, milling tools are previously known belonging to the category that distributes the cooling liquid in an external, indifferent flow, more precisely from a central nozzle via peripheral slots adjacent to the individual chip channels and milling inserts. Because of that, no distinct jets of appreciable pressure via internal branch ducts can be provided.

In SE 517817, there is shown a milling tool that, per se, includes a form of branch ducts intended to individually distribute cooling liquid to the individual milling inserts. However, in this case, the branch ducts are in the form of open grooves in the front surface of the milling cutter head and no sealing cover at all is included in the tool.

SUMMARY

With reference to FIGS. 1-4 as well as FIG. 10, a brief description follows below of the general structural features of the present type of milling tool. The main components of the same are a front head 1 and a rear holder or adapter 2, both of which have a rotationally symmetrical basic shape and, in the assembled state, are concentric with a common centre axis C, around which the tool is rotatable. The holder 2 is intended to be fixed in a driving machine (not shown) and includes a rear recess 3, which in this case constitutes one of the parts, the female-like one, of a coupling, the male-like part of which is included in the machine. The head 1 as well as the holder 2 may advantageously be manufactured from steel.

In the head 1, there are included a plurality of peripheral, and tangentially spaced-apart milling inserts 5, e.g. of cemented carbide, which in a conventional way are replaceable and placed adjacent to each a chip channel 6. Inside the head 1 (see FIG. 4), there is a front, cylindrical chamber 7 and a rear, likewise cylindrical seat 8 between which a ring-shaped shoulder or support surface 9 is provided as a consequence of the chamber 7 having been given a diameter that is greater than the diameter of the seat 8. The chamber 7 opens in the front end of the head 1 and has its mouth surrounded by a ring-shaped surface 10 (henceforth denominated "ring surface"). From the chamber 7, there extend branch ducts 11 in the form of drill holes, which mouth in the outside of the head 1. More precisely, the individual branch duct 11 extends to a chip channel 6 and has its mouth situated near the milling insert 5. The individual branch duct 11 is advantageously bored at such an angle that a passing, tight liquid jet is directed toward the chip surface of the milling insert 5.

The head 1 and the holder 2 are detachably interconnected via a male/female coupling, which, in addition to the seat 8, includes a male member 12 in the form of a socket included in the front part of the holder 2 and having a rotationally symmetrical basic shape. In the example, the outside 13 of the socket—as well as the inside 14 of the seat 8—is cylindrical, although also a conical shape is conceivable. The socket 12 is shorter than the seat 8, and therefore the front, ring-shaped end surface 15 thereof will be located axially behind the shoulder 9, when the connection of the head and the holder has been effected.

In order to hold together the components 1 and 2, a screw 16 is used having a head 17 that is kept pressed against a washer 18, which has been brought to abut against the shoulder 9. Said screw 16 has a male thread 19a that can be tightened in a female thread 19b included in a front section of a central, through bore 20, which serves as a main duct for the feed of cooling liquid in the forward direction through the tool. In this case, the screw 16 is solid, i.e., lacks holes, and may advantageously be manufactured from steel (like the head 1 and the holder 2).

In the tool, there is also included a cover 21 that has the purpose of sealing the chamber 7 and thereby force out the fed cooling liquid through the branch ducts 11.

Figure 10:
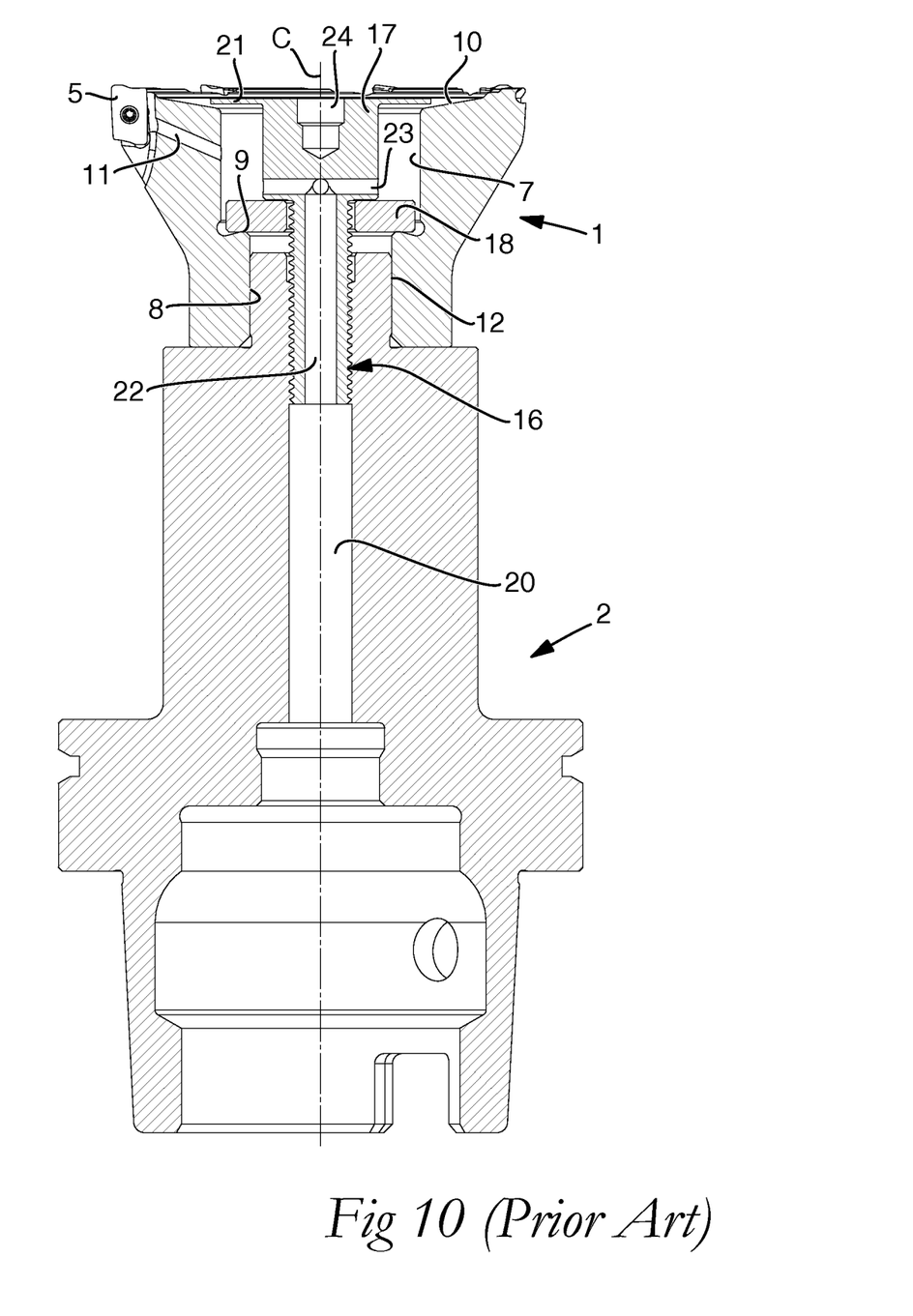
FIG. 10 is a longitudinal section through a previously known milling tool belonging to the same category as the disclosed tool (Prior Art).

Reference is now made to FIG. 10 that illustrates a milling tool, which is previously known by open use (marketed by SANDVIK COROMANT AB). An advantage of the same tool as well as the tool according to the invention is that the cooling liquid (or another suitable fluid) can be fed in a pressurized state to a collecting chamber of the head and after that, via internal branch ducts, is distributed out to the milling inserts/chip channels in the form of distinct, tight jets, which in an effective way remove the chips from the milling inserts and the surroundings thereof. A disadvantage of the known tool according to FIG. 10 is, however, that the cover 21, which has the purpose of sealing the chamber 7, is integrated with the head of the screw 16 and arranged to sealingly be pressed against the ring surface 10 by means of one and the same threaded joint that has the purpose of holding together the head 1 and the holder 2 by pressing the washer 18 against the shoulder 9. Thus, the screw 16 is, in this case, formed with a central bore 22 that runs through the threaded shank of the screw and branches into a number of branch ducts 23 inside the head 17, at the same time as the washer 18 (with the exception of its central hole) is solid and therefore does not allow liquid to pass from the seat 8 to the chamber 7. A key grip 24 in the screw head allows tightening of the screw while simultaneously tightening the washer 18 against the shoulder 9 as well as the cover 21 against the ring surface 10. Also the washer 18 may advantageously be manufactured from steel.

To be able to tighten both the washer 18 and the cover 21 by means of one single threaded joint, viz. the male thread 19a of the screw and the female thread 19b in the bore 20, in the above-described way may seem attractive from manufacturing and handling points of view. However, in practice, this design solution involves problems difficult to master. Namely, if the dimensional accuracy of the screw, above all in respect of the axial extension of the head, does not become meticulous, risk of leakage arises between the cover and the surrounding ring surface 10. After the tightening of the screw 16 by a prescribed torque, the cover 21 can accordingly come to stop at a certain distance from the ring surface 10, whereby the liquid can leak out in a shower-like flow, which—depending on the size of the leak—reduces the liquid pressure and thereby the efficiency of the targeted jets passing through the branch ducts 11. In other words, the efficiency of the liquid flushing is deteriorated at the same time as unnecessary great quantities of liquid splashes around inefficaciously. Alternatively, the cover may—by too early being pressed against the ring surface 10—prevent the screw from holding together the head and the holder by a sufficiently great force.

An exemplary embodiment of a milling tool for chip removing machining comprises a front head and a rear holder, which are detachably connected by means of a male/female coupling that includes a male member included in a front part of the rear holder, a seat that mouths in a rear end of the front head and, via a shoulder, transforms into a wider chamber mouthing in the front end of the front head adjacent to a ring surface, a washer pressed against the shoulder by means of a first threaded joint comprising a male thread on a screw provided with a head, and a female thread included in a through bore that runs through the rear holder and serves as a main duct for conveyance of a fluid to said chamber, from which branch ducts extend toward individual milling inserts and chip channels in the periphery of the front head in order to individually feed the fluid to the same, and a cover sealing the chamber and that is held applied against the ring surface, wherein the cover is tightenable against the ring surface by means of a second threaded joint that is operative independently of the first threaded joint.

BRIEF DESCRIPTION OF THE DRAWING

Before the disclosed milling tool, and the merits thereof in comparison with previously known milling tools, is described in more detail, the general structural features of the present tools will be made clear with the aid of the subsequent drawings in which.

DETAILED DESCRIPTION

A characteristic of the invention (see FIGS. 1-9 that illustrate a first embodiment of the invention) is that the cover 21 is tightenable against the ring surface 10 by means of a second threaded joint, which is independent from the first threaded joint 19a, 19b that presses the washer 18 against the shoulder 9. In the preferred embodiment according to FIGS. 1-9, this has been realized by the head 17 of the screw 16 being formed with a male thread 25 for the co-operation with a female thread 26 on the inside of a cylindrical cuff 27, which is included as an integrated part of the cover 21. More precisely, the cuff 27 is arranged on the back side of the cover, the cover including a key grip 28 that is accessible from the front and by means of which the same can be screwed on and off the screw head. In this case, the screw is solid so far that the same lacks a liquid duct. The key grip 24 opens in the front side of the head, and by means of which solely the proper screw 16 can be tightened against the washer 18.

In this case, the head 1 is applied to a holder 2, the main duct 20 of which branches into a number of drilled holes 30 that, with its one end, mouths in the main duct 20 and with its other one in the front end surface 15 of the socket 12. Furthermore, in the washer 18, there are formed a suitable number of through holes 32, via which the liquid from the main duct 20 and the branch holes 30 can pass between the seat 8 and the chamber 7. In the example, the number of holes 32 amounts to four. A central hole 33 in the washer has a somewhat greater diameter than the screw.

The cover 21 may, like other components of the tool, be manufactured from steel. Alternatively, the same may also be manufactured from materials having greater elasticity and lower weight than steel, such as aluminium, plastic, or miscellaneous composites. It should furthermore be pointed out that, in the example, the key grip 28 of the cover is in the form of a through hole. If the cover is given a sufficient thickness, the key grip can also be formed as a seat countersunk in the upper side thereof.

The part of the cover that corbels out outside the cuff 27, and that forms a peripheral brim, may advantageously be comparatively thin to guarantee a certain elasticity of the same. Thus, the thickness should be within the range of 0.5-2 mm. Furthermore, the diameter of the brim should be at least 50%, suitably at most 100% greater than the diameter of the cuff.

The Function and Advantages of the Invention: When the different components of the tool should be coupled together, the socket 12 is applied to the seat 8, besides which the washer 18 is abutted against the shoulder 9. In the next step, the screw 16 is brought in place and is tightened in the female thread 19*b* by a suitable torque. In such a way, the head 1 is locked to the holder 2 via the washer 18. In a concluding step, the cover 21 is applied and tightened via the second threaded joint constituted by the co-operating male and female threads 25, 26. As a consequence of the fact that the two described threaded joints can be activated independently of each other, a reliable sealing is guaranteed of the periphery of the cover against the ring surface 10. Thus, the sealing effect will not be dependent on the dimensional accuracy of the co-operating components, viz. the washer, the screw head, and the cover. Neither can the cover detrimentally affect the correct tightening of the screw.

Figure 11:
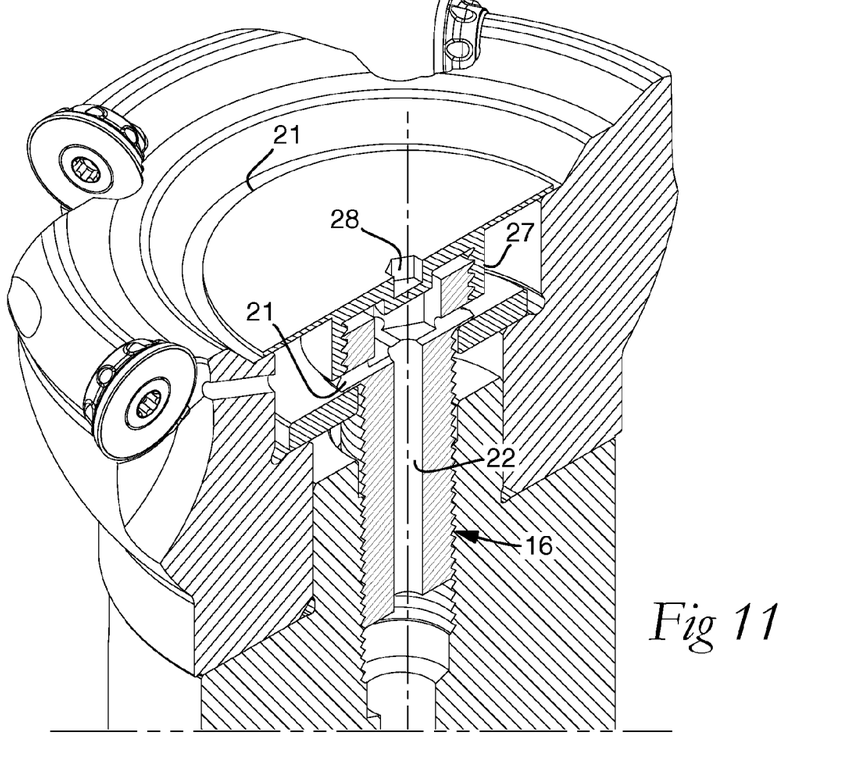
FIG. 11 is a partial, sectioned perspective view showing an alternative embodiment of the milling tool.
Figures 12, 13:
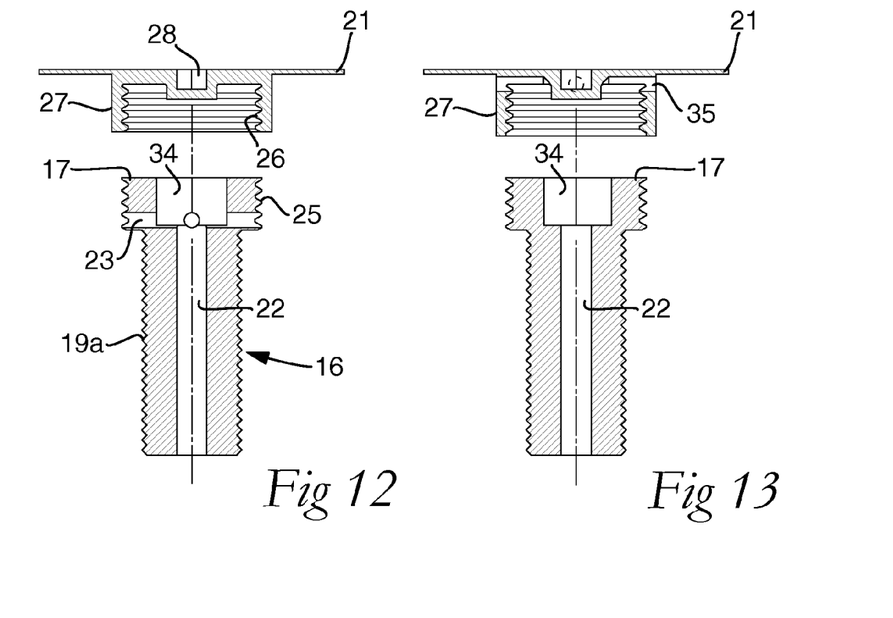
FIG. 12 is an exploded view showing a screw and a cover included in the embodiment according to FIG. 11.
FIG. 13 is an exploded view showing a screw and a cover included in a further alternative embodiment of the disclosed tool.

Brief Description of Alternative Embodiments: Reference is now made to FIGS. 11 and 12, which illustrate an alternative embodiment of the milling tool. Like the known tool according to FIG. 10, in this case, the tool includes a screw 16, which includes a central bore 22 that runs through the threaded shank of the screw and branches into a number of branch ducts 23 inside the head 17. However, in this case, the bore 22 extends all the way between the opposite ends of the screw and includes a widened section 34 in the head 17. In addition, the head 17 is—in accordance with exemplary embodiments—formed with an external thread 25 for the co-operation with a female thread 26 included in the cuff 27 of the cover 21.

In the embodiment according to FIGS. 11 and 12, the key grip 28 is in the form of a seat formed in a central, thickened knob that is accommodated in the widened section 34 of the bore 22. When the cover is tightened on the screw, the rear end surface of the cuff will be located above the branch ducts 23, so that the fed fluid can pass freely out into the chamber 7.

Finally, in FIG. 13, there is shown an alternative embodiment in which the requisite branch ducts are on the form of radial holes 35 in the cuff 27 of the cover 21. These holes 35 are located in the immediate vicinity of the brim of the cover. In this case, branch ducts do not need to be drilled in the head 17 of the screw 16 because the fluid, which is fed through the bore 22, can be distributed out into the surrounding chamber via the holes 35 in the cuff.

Figures 1, 2:
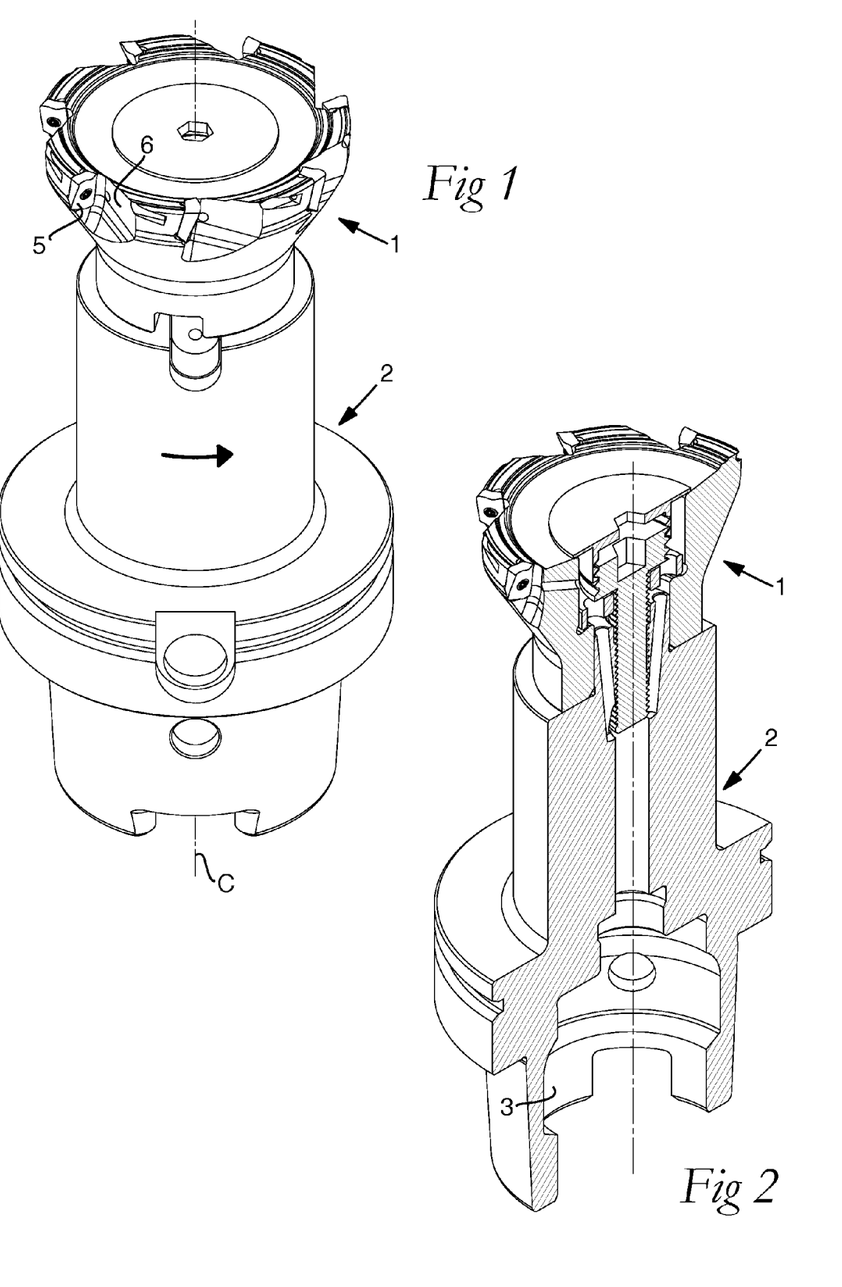
FIG. 1 is a perspective view of a milling tool.
FIG. 2 is an analogous perspective view, which is sectioned to show the inside of the tool.
Figure 3:
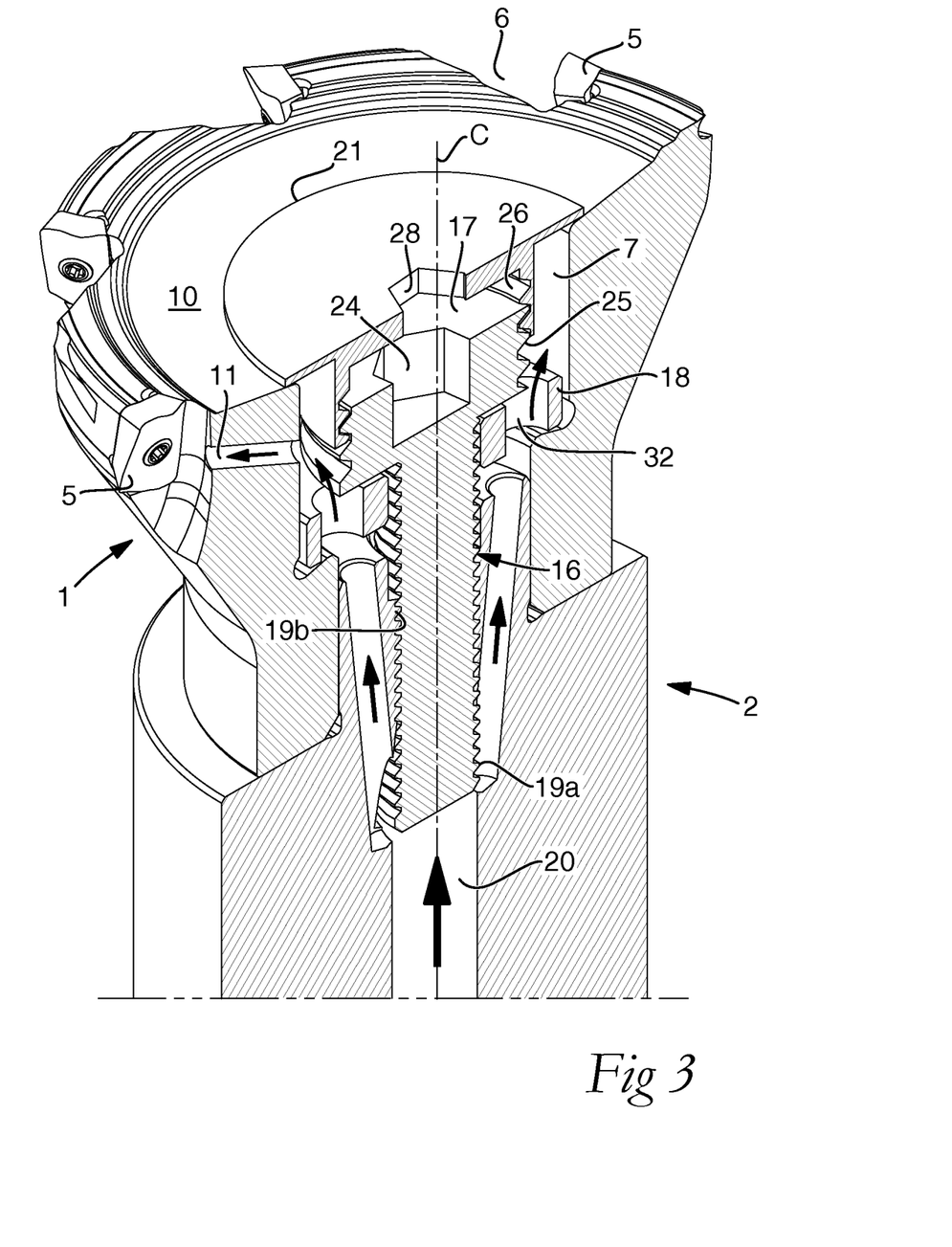
FIG. 3 is an enlarged, sectioned perspective view showing the head of the tool and a smaller part of the holder of the tool.
Figure 4:
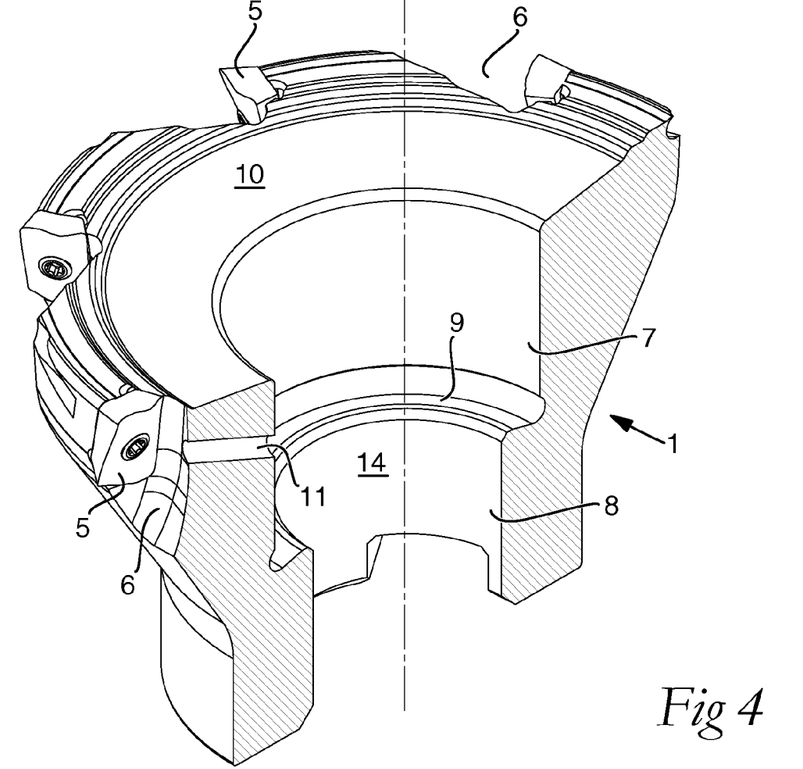
FIG. 4 is a perspective exploded view, which in a sectioned state shows the head spaced-apart from the holder.
Figure 5:
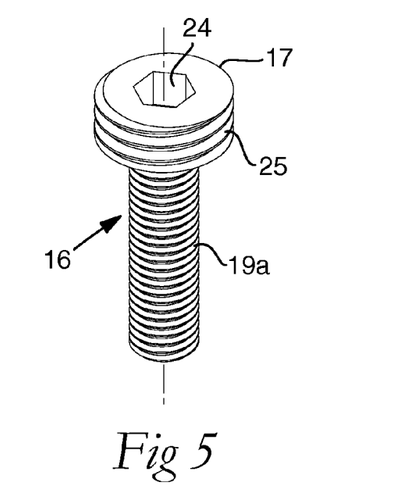
FIG. 5 is a bird's eye view showing a screw for the fixation of the head on the holder.
Figure 6:
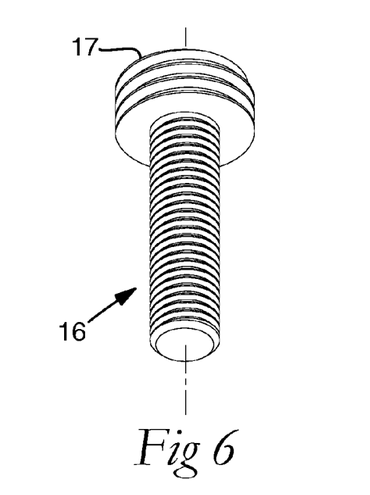
FIG. 6 is a worm's eye view of the same screw.
Figure 7:
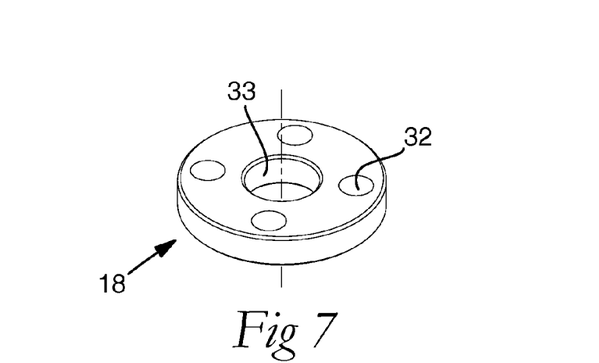
FIG. 7 is a perspective view of a washer co-operating with the screw.
Figure 8:
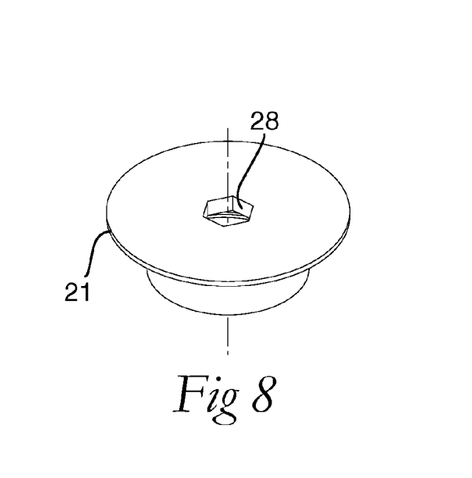
FIG. 8 is a bird's eye view of a cover for the seal of a chamber included in the head.
Figure 9:
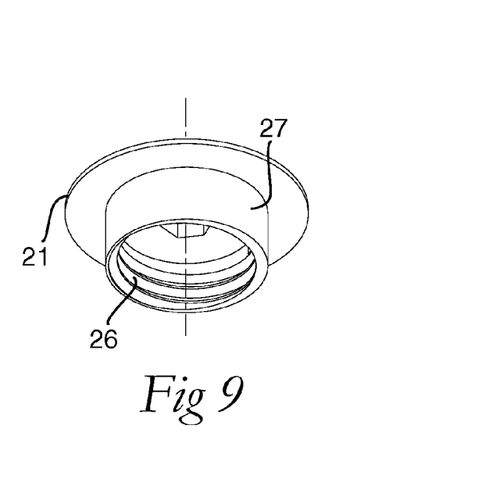
FIG. 9 is a worm's eye view of the same cover.

In all embodiments, it is preferred to form homologous threads in the two separate threaded joints, so that they run in the same direction. If, for instance, the male thread 19*a* shown in FIG. 5 is right-threaded, also the male thread 25 is made right-threaded. In such a way, it is guaranteed that the initial tightening of the screw does not risk being counteracted by the subsequent tightening of the sealing cover 21. In other words, the tightening of the screw as well as the cover is carried out in one and the same direction. What is more, this direction may be selected so that it harmonizes with the direction of rotation of the tool in so far that the rotation aims to tighten the screw and the cover, respectively, rather than to loosen the same.

For the sake of completeness, it should also be pointed out that the components 1, 2, 16 and 21 all are concentric with the common centre axis C.

Feasible Modifications: The invention is not limited only to the example described above and shown in the drawings. Thus, it is feasible to arrange the second threaded joint, which is used to separately tighten the sealing cover, between the pipe section of the cover and the inner surface of the collecting chamber, instead of between the pipe section and the screw head. In the example, the key grip in the screw head is greater than the key grip in the cover. When the key grip of the cover is in the form of a through hole, also the opposite alternative is feasible, i.e., the key grip of the cover is made greater or wider than the one of the screw. In such a way, the key for the screw can be inserted into its key grip without the cover first needing to be removed from the screw head (e.g. in connection with loosening of the screw). Furthermore, it is feasible to feed fluid in two flows from the main duct to the chamber in the front head, viz. a first flow of the type that is illustrated in FIGS. 1-9, where the feed is effected via tilted ducts in the holder and holes in the washer, as well as a second flow via a hollow screw of the type shown in FIGS. 11-13. The feeding of the fluid in two flows may in certain applications be advantageous, namely if the available space for the ducts in the tool body and the screw, respectively, is limited.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:
1. Milling tool for chip removing machining, comprising:
  a front head and a rear holder, which are detachably connected by means of a male/female coupling that includes a male member included in a front part of the rear holder and a female member in a rear part of the front head;
  a seat that mouths in a rear end of the front head and, via a shoulder, transforms into a wider chamber mouthing in the front end surface of the front head adjacent to a ring surface;
  a washer pressed against the shoulder by means of a first threaded joint comprising a male thread on a screw provided with a head, and a female thread included in a through bore that runs through the rear holder and serves as a main duct for conveyance of a fluid to said chamber, and from the chamber branch ducts extend toward individual milling inserts and chip channels in the periphery of the front head in order to individually feed the fluid to the same; and
  a cover sealing the chamber and that is applied against the ring surface,
  wherein the cover is tightenable against the ring surface by means of a second threaded joint that is operative independently of the first threaded joint, and wherein an inner diameter surface of the seat extends axially from the rear end surface of the front head to a forward distal end that forms a corner with a radially extending surface of the shoulder, wherein a plurality of passages for coolant flow are located in at least a portion of the male member, wherein a first end of the plurality of passages for coolant flow opens to the main duct, and wherein a second end of the plurality of passages for coolant flow has an opening that is located in a radially extending front end surface of the male member.

2. Milling tool according to claim 1, wherein the second threaded joint comprises a first thread included in the head of the screw, as well as a second thread included in a member projecting from a back side of the cover.

3. Milling tool according to claim 2, wherein said member is a cylindrical cuff having an internal female thread, the first thread being a male thread on the outside of the screw head.

4. Milling tool according to claim 3, wherein the screw includes a central, secondary fluid duct and one or more radial branch ducts that are formed in the head and located near the rear end of the head.

5. Milling tool for chip removing machining, comprising:
a front head and a rear holder, which are detachably connected by means of a male/female coupling that includes a male member in a front part of the rear holder and a female member in a rear part of the front head;
a seat that mouths in a rear end of the front head and, via a shoulder, transforms into a wider chamber mouthing in a front end of the front head adjacent to a ring surface;
a washer pressed against the shoulder by means of a first threaded joint comprising a male thread on a screw provided with a head, and a female thread included in a through bore that runs through the rear holder and serves as a main duct for conveyance of a fluid to said chamber, and from the chamber branch ducts extend toward individual milling inserts and chip channels in the periphery of the front head in order to individually feed the fluid to the same; and
a cover sealing the chamber and that is applied against the ring surface,
wherein the cover is tightenable against the ring surface by means of a second threaded joint that is operative independent of the first threaded joint,
wherein said member is a cylindrical cuff having an internal female thread, the first thread being a male thread on the outside of the screw head, and
wherein the cuff includes a plurality of through holes located in the vicinity of the cover.

6. Milling tool according to claim 5, wherein the screw includes a central, secondary fluid duct and one or more radial branch ducts that are formed in the head and located near the rear end of the head.

7. Milling tool according to claim 1, wherein the washer comprises one or more axial, through holes for the passage of fluid from the seat to the chamber.

8. Milling tool according to claim 1, wherein homologous threads in the first threaded joint and the second threaded joint run in one and the same direction upon tightening in order to rotate the screw and the cover in one and the same direction of rotation.

9. Milling tool according to claim 1, wherein the first end of the plurality of passages for coolant flow opens to the main duct at an axial location that is axially displaced from the male member.

10. Milling tool according to claim 9, wherein the second end of the plurality of passages for coolant flow opens to the wider chamber.

11. Milling tool for chip removing machining, comprising:
a front head and a rear holder, which are detachably connected by means of a male/female coupling that includes a male member in a front part of the rear holder and a female member in a rear part of the front head;
a seat that mouths in a rear end surface of the front head and, via a shoulder, transforms into a wider chamber mouthing in a front end surface of the front head adjacent to a ring surface;
a washer pressed against the shoulder by means of a first threaded joint comprising a male thread on a screw provided with a head, and a female thread included in a through bore that runs through the rear holder and serves as a main duct for conveyance of a fluid to said chamber, and from the chamber branch ducts extend toward individual milling inserts and chip channels in the periphery of the front head in order to individually feed the fluid to the same; and
a cover sealing the chamber and that is applied against the ring surface,
wherein the cover is tightenable against the ring surface by means of a second threaded joint that is operative independent of the first threaded joint,
wherein an inner diameter surface of the seat extends axially from the rear end surface of the front head to a forward distal end that forms a corner with a radially extending surface of the shoulder, and
wherein a passage for coolant flow is located in a threaded shank of the screw.

12. Milling tool according to claim 11, wherein a first end of the passage for coolant flow opens to the main duct at an axial location that is axially displaced from the male member.

13. Milling tool according to claim 12, wherein a second end of the passage for coolant flow opens to a widened section in the head of the screw.

14. Milling tool according to claim 13, wherein the widened section in the head of the screw is connected by at least one branch duct to the wider chamber.

15. Milling tool according to claim 1, wherein at least a portion of the inner diameter surface of the seat axially overlaps at least a portion of an inner diameter surface of the wider chamber.

16. Milling tool according to claim 1, wherein the washer contacts the shoulder proximate the corner.

17. Milling tool according to claim 3, wherein the cuff includes a plurality of through holes located in the vicinity of the cover.

18. Milling tool according to claim 17, wherein the screw includes a central, secondary fluid duct and one or more radial branch ducts that are formed in the head and located near the rear end of the head.

19. Milling tool according to claim 11, wherein homologous threads in the first threaded joint and the second threaded joint run in one and the same direction upon tightening in order to rotate the screw and the cover in one and the same direction of rotation.

* * * * *